United States Patent
Steele, Jr.

(10) Patent No.: US 6,976,050 B2
(45) Date of Patent: Dec. 13, 2005

(54) SYSTEM AND METHOD FOR EXTRACTING THE HIGH PART OF A FLOATING POINT OPERAND

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 492 days.

(21) Appl. No.: 10/036,133

(22) Filed: Dec. 28, 2001

(65) Prior Publication Data

US 2002/0178201 A1 Nov. 28, 2002

Related U.S. Application Data

(60) Provisional application No. 60/293,173, filed on May 25, 2001.

(51) Int. Cl.⁷ .................................................. G06F 5/00
(52) U.S. Cl. ...................................................... 708/495
(58) Field of Search ............................... 708/495, 496

(56) References Cited

U.S. PATENT DOCUMENTS

| | | |
|---|---|---|
| 3,725,649 A | 4/1973 | Deerfield |
| 4,777,613 A | 10/1988 | Shahan et al. |
| 4,788,655 A | 11/1988 | Nakayama et al. |
| 4,991,131 A | 2/1991 | Yeh et al. |
| 5,065,352 A | 11/1991 | Nakano |
| 5,126,963 A | 6/1992 | Fukasawa |
| 5,161,117 A | 11/1992 | Waggener, Jr. |
| 5,249,149 A | 9/1993 | Cocanougher et al. |
| 5,307,303 A | 4/1994 | Briggs et al. |
| 5,347,481 A | 9/1994 | Williams .................... 364/748 |
| 5,347,482 A | 9/1994 | Williams .................... 364/757 |
| 5,357,237 A | 10/1994 | Bearden et al. |
| 5,363,321 A | 11/1994 | Dao Trong et al. |
| 5,365,465 A | 11/1994 | Larson |
| 5,481,489 A | 1/1996 | Yanagida et al. |
| 5,570,310 A | 10/1996 | Smith |
| 5,666,301 A | 9/1997 | Makino |
| 5,748,516 A | 5/1998 | Goddard et al. |
| 5,812,439 A | 9/1998 | Hansen |
| 5,862,066 A | 1/1999 | Rossin et al. |
| 5,892,697 A | 4/1999 | Brakefield |
| 5,931,943 A | 8/1999 | Orup |
| 5,953,241 A | * 9/1999 | Hansen et al. .............. 708/501 |
| 5,963,461 A | 10/1999 | Gorshtein et al. |
| 5,978,901 A | 11/1999 | Luedtke et al. |
| 5,995,991 A | 11/1999 | Huang et al. |
| 6,009,511 A | 12/1999 | Lynch et al. ................ 712/222 |
| 6,049,865 A | 4/2000 | Smith |
| 6,105,047 A | 8/2000 | Sharangpani et al. |
| 6,108,772 A | 8/2000 | Sharangpani |
| 6,131,106 A | 10/2000 | Steele, Jr. ................... 708/510 |
| 6,138,135 A | * 10/2000 | Karp .......................... 708/496 |
| 6,151,669 A | 11/2000 | Huck et al. |

(Continued)

OTHER PUBLICATIONS

U.S. Appl. No. 10/028,375, filed Dec. 28, 2001, Steele, Jr.
U.S. Appl. No. 10/035,579, filed Dec. 28, 2001, Steele, Jr.

(Continued)

Primary Examiner—D. H. Malzahn
(74) Attorney, Agent, or Firm—Finnegan, Henderson, Farabow, Garrett & Dunner, L.L.P.

(57) ABSTRACT

A method and system determine a high part of a floating point operand. Exponent field bits and fraction field bits of a result are set to a zero if the determined format is an infinity format or an overflow format. The exponent field bits and the fraction field bits of the result are set to corresponding exponent field bits and corresponding fraction field bits of the floating point operand if the determined format is a not-a-number (NaN) format. At least one of the fraction field bits of the result is adaptively cleared if the determined format is a denormalized format or a delimited format.

24 Claims, 13 Drawing Sheets

U.S. PATENT DOCUMENTS

| | | | |
|---|---|---|---|
| 6,189,094 | B1 | 2/2001 | Hinds et al. |
| 6,205,460 | B1 | 3/2001 | Steele, Jr. |
| 6,256,655 | B1 | 7/2001 | Ezer et al. |
| 6,360,189 | B1 | 3/2002 | Hinds et al. |
| 6,393,555 | B1 | 5/2002 | Meier et al. |
| 6,490,607 | B1 | 12/2002 | Oberman |
| 6,594,681 | B1 | 7/2003 | Prabhu |
| 6,629,120 | B1 | 9/2003 | Walster et al. |
| 6,658,443 | B1 | 12/2003 | Walster |
| 6,658,444 | B1 | 12/2003 | Walster et al. |
| 6,697,832 | B1 | 2/2004 | Kelley et al. |
| 6,732,134 | B1 * | 5/2004 | Rosenberg et al. ......... 708/495 |
| 6,789,098 | B1 | 9/2004 | Dijkstra |
| 2002/0194232 | A1 | 12/2002 | Walster |
| 2003/0033335 | A1 | 2/2003 | Walster |

OTHER PUBLICATIONS

U.S. Appl. No. 10/035,580, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
Title: "Safe Treatment of Overflow and Underflow Conditions", by Robert A. Fraley & J. Stephen Walther, Hewlett–Packard Co., pp. 1–5.
Title: "Vax Floating Point: A Solid Foundation for Numerical Computation", by Mary Payne & Dileep Bhandarkar, Digital Equipment Corp., pp. 1–12.
Title: Lecture Notes on the Status of "IEEE Standard 754 for Binary Floating–Point Arithmetic", by Prof. W. Kahan, May 31, 1996, pp. 1–30.
Title: "Interval Arithmetic Specification" by Dmitri Chiriaev & G. William Walster, Draft revised May 4, 1998, pp. 1–78.
Title: "IEEE Standard for Binary Floating–Point Arithmetic IEEE Standard 754–1985," by Standards Committee of the IEEE Computer Society, The Institute of Electrical and Electronics Engineers, Inc., copyright 1985, pp. 1–14.
U.S. Appl. No. 10/035,581, filed Dec. 28, 2001, G. L. Steele, Jr.
U.S. Appl. No. 10/320,547, filed Dec. 17, 2002, Steele, Jr.
U.S. Appl. No. 10/320,450, filed Dec. 17, 2002, Steele, Jr.
Office Action mailed May 5, 2005 in U.S. Appl. No. 10/035,674.

* cited by examiner

SYSTEM AND METHOD FOR EXTRACTING THE HIGH PART OF A FLOATING POINT OPERAND

RELATED APPLICATIONS

Applicant claims the right of priority based on U.S. Provisional Patent Application No. 60/293,173 filled May 25, 2001 in the name of Guy L. Steele, Jr.

U.S. patent application Ser. No. 10/035,747, filed on even date herewith in the name of Guy L. Steele Jr. and entitled "Floating Point Unit in which Floating Point Status Information is Encoded in Floating Point Representations," assigned to the assignee of the present application, is hereby incorporated by reference.

DESCRIPTION OF THE INVENTION

1. Field of the Invention

The present invention relates to floating point processing, and, more particularly, to systems and methods for computing the high part of a floating point number.

2. Background of the Invention

IEEE Standard 754 (hereinafter "IEEE Std. 754" or "the Standard") published in 1985 by the Institute of Electrical and Electronic Engineers, and adopted by the American National Standards Institute (ANSI), defines several standard formats for expressing values as a floating point number. In accordance with IEEE Std. 754, a floating point format is represented by a plurality of binary digits, or "bits," having the structure:

$$se_{msb} \ldots e_{lsb}f_{msb} \ldots f_{lsb}$$

where "msb" represents "most significant bit" and "lsb" represents "least significant bit." The bit string comprises a sign bit, s, which indicates whether the number is positive or negative. The bit string further comprises an exponent field having bits $e_{msb} \ldots e_{lsb}$ representing a biased exponent, e. Still further, the bit string comprises a fraction field having bits $f_{msb} \ldots f_{lsb}$ representing a fraction field of a significand. A significand comprises an explicit or implicit leading bit to the left of an implied binary point and a fraction field to the right of the implied binary point.

IEEE Std. 754 defines two general formats for expressing a value, namely, a "single" format, which comprises thirty-two bits, and a "double" format, which comprises sixty-four bits. In the single format, there is one sign bit, s, eight bits, $e_7 \ldots e_0$, comprising the exponent field, and twenty-three bits, $f_{22} \ldots f_0$, comprising the fraction field. In the double format, there is one sign bit, s, eleven bits, $e_{10} \ldots e_0$, comprising the exponent field, and fifty-two bits, $f_{51} \ldots f_0$, comprising the fraction field.

The value of a number represented in accordance with IEEE Std. 754 is determined based on the bit patterns of the exponent field bits, $e_{msb} \ldots e_{lsb}$, and the fraction field bits, $f_{msb} \ldots f_{lsb}$, both for the single and double formats. The value of a number represented in accordance with IEEE Std. 754 is positive or negative infinity, depending on the value of the sign bit, s, if the exponent field bits, $e_{msb} \ldots e_{lsb}$, are all binary ones (that is, if the bits represent a binary-encoded value of "255" in the single format or "2047" in the double format) and the fraction field bits, $f_{msb} \ldots f_{lsb}$, are all binary zeros. In particular, the value, v, of the number is $v=(-1)^s\infty$, where "$\infty$" represents the value infinity. On the other hand, if the exponent field bits, $e_{msb} \ldots e_{lsb}$, are all binary ones and the fraction field bits, $f_{msb} \ldots f_{lsb}$, are not all zeros, then the value that is represented is deemed "not a number," abbreviated "NaN."

Further, if the exponent bits, $e_{msb} \ldots e_{lsb}$, are neither all binary ones nor all binary zeros (that is, if the bits represent a binary-encoded value between 1 and 254 in the single format or between 1 and 2046 in the double format), the number is in a "normalized" format and the value of the number is $v=(-1)^s2^{e-bias}(1.|f_{msb} \ldots f_{lsb})$, where "|" represents a concatenation operation. That is, in the normalized format, a leading bit having the value "one" followed by a binary point and the fraction field bits is implied thereby increasing the size of the fraction field by one bit to twenty four bits in the single format and to fifty three bits in the double format. In effect, the fraction field represents a value greater than or equal to one and less than two.

Still further, if the exponent field bits, $e_{msb} \ldots e_{lsb}$, are all binary zeros and the fraction field bits, $f_{msb} \ldots f_{lsb}$, are not all zero, the number is in a "de-normalized" format and the value of the number is $v=(-1)^s2^{e-bias+1}(0.|f_{msb} \ldots f_{lsb})$. The range of values that can be expressed in the de-normalized format is disjoint from the range of values that can be expressed in the normalized format, for both the single and double formats.

Finally, if the exponent field bits, $e_{msb} \ldots e_{lsb}$, are all binary zeros and the fraction field bits, $f_{msb} \ldots f_{lsb}$, are all zeros, the value of the number is "zero". The value "zero" may be positive zero or negative zero, depending on the value of the sign bit.

In some floating-point computations, particularly in carefully written numerical libraries, it is desirable to extract a "high part" of an input floating point number to obtain a resulting floating point number with the same sign and exponent as the input floating point number and a smaller fraction than the input floating point number. The fraction of the resulting floating point number is chosen so that the difference between the fraction of the resulting floating point number and the fraction of the input floating point number is very small and the significand of the resulting floating point number can be squared exactly without loss of precision.

Conventionally, the high part of an input floating point number is determined by clearing a predetermined number of least significant fraction field bits of the input floating point number. For example, in the well-known "fdlibm" numerical library, the high part of a 64-bit input floating point number is computed by first storing the 64-bit input floating point number in memory. Type-cast operations are then used to regard the variable as two 32-bit integers. The 32-bit integer represented by the least significant fraction field bits is set equal to zero. Finally, the 64-bit floating point variable is read again, containing the high part of the 64-bit input floating point number originally stored.

There are several drawbacks to the conventional approach. First, setting the 32-bit integer represented by the least significant fraction field bits equal to zero produces a less accurate high part. In particular, it causes the difference between the fraction of the resulting floating point number and the fraction of the input floating point number to undesirably become too large. Second, storing the 64-bit input floating point number to memory typically requires more time than an operation performed in registers on most computers with their associated programming language compilers. Third, sensible results are not always obtained when the input floating point number is in a denormalized, NaN, infinity, or overflow format according to the floating-point number system disclosed in related U.S. patent application Ser. No. 10/035,747 or in an infinity or NaN format according to IEEE Std. 754. For example, typically, to compute the "low part" of a number, the "high part" of the number is subtracted from the number. However, if the number is infinity, the high part of the number will also be infinity using the conventional approach. The subtraction of the high part of the number from the number will produce a floating point number having the NaN format. Also, clearing the low bits of a NaN formatted operand may lose valuable information. Therefore, inputs in a denormalized, NaN, infinity, or overflow format according to the floating-point number system disclosed in related U.S. patent application Ser. No. 10/035,747 or in an infinity or NaN format according to IEEE Std. 754 must be tested for and handled separately as special cases in the conventional approach, which introduces additional undesirable costs in memory space and time.

SUMMARY OF THE INVENTION

There is provided a method for determining a high part of a floating point operand. The method comprises determining a format of the floating point operand and setting a plurality of exponent field digits and a plurality of fraction field digits of a result to a zero if the determined format is one of a first group comprising an infinity format and an overflow format. The method further comprises setting the exponent field digits and the fraction field digits of the result to corresponding exponent field digits and corresponding fraction field digits of the floating point operand if the determined format is a not-a-number (NaN) format. Still further, the method comprises adaptively clearing at least one of the fraction field digits of the result if the determined format is one of a second group comprising a denormalized format and a delimited format, wherein the high part of the floating point operand is the result.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
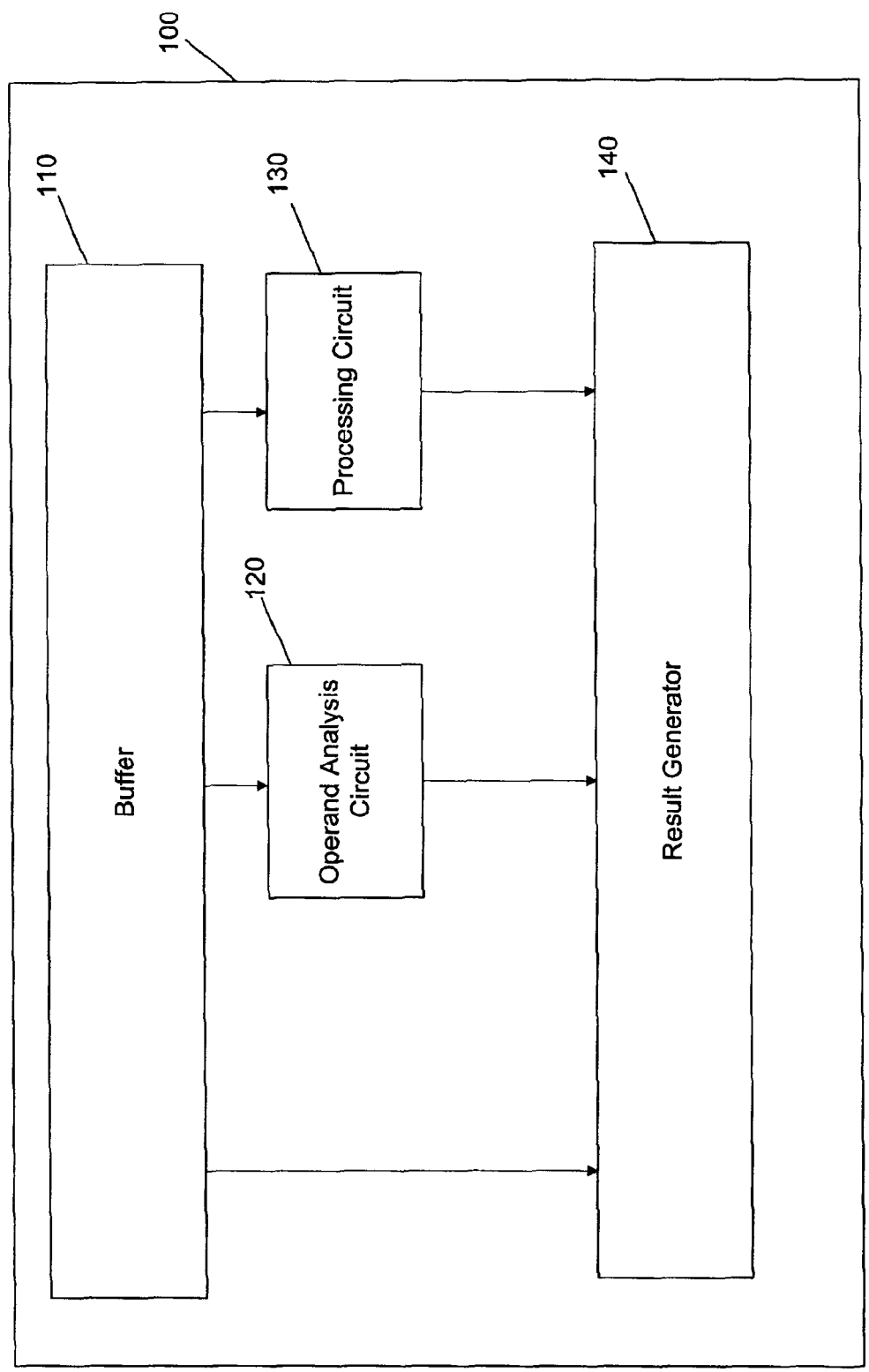
FIG. 1 illustrates an exemplary floating point unit for computing the high part of a floating point operand according to an embodiment of the present invention.

FIG. 1 illustrates an exemplary floating point unit 100 that may be used to compute the high part of a floating point number. That is, the floating point unit 100 receives an input floating point number and outputs a resulting floating point number that may have a smaller fraction than the input floating point number and whose significand may be squared exactly, without loss of precision. The floating point unit 100 computes the high part of a floating point number based on the format of the floating point number. The floating point unit 100 computes the high part of special input floating point numbers that are in the overflow, infinity, or NaN format shown in FIG. 12 and also described in related U.S. patent application Ser. No. 10/035,747 or in the infinity or NaN format according to IEEE Std. 754 so that the low part of these special floating point numbers may be computed to produce sensible results. The floating point unit 100 may adaptively compute the high part of an input floating point number that is in a denormalized format according to IEEE Std. 754. That is, floating point unit 100 does not simply clear a predetermined number of least significant fraction field bits of the input floating point number. Instead, the number of least significant fraction field bits that may be cleared by floating point unit 100 depends on the number of leading zeros in the fraction field of the input floating point number.

Figure 13:
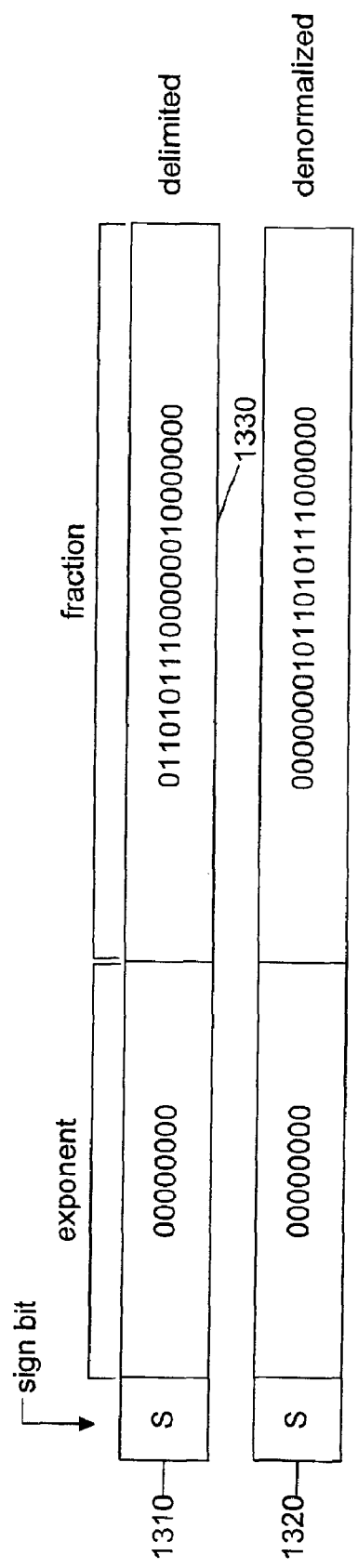
FIG. 13 illustrates additional exemplary formats for representing a floating point operand.

Additionally, the floating point unit 100 may adaptively compute the high part of an input floating point number that is in a delimited format shown in FIG. 13 and also described in U.S. Pat. No. 6,131,106, entitled "System And Method For Floating-Point Computation For Numbers In Delimited Floating-Point Representation," which hereby is incorporated by reference. More specifically, for an input floating point number in the delimited format, the number of least significant fraction field bits that may be cleared by floating point unit 100 depends on the placement of the delimiter flag in the fraction field of the input floating point number. Finally, the exemplary floating point unit 100 may not store an input floating point number in memory as part of the process to compute the high part of the input floating point number.

Figure 2:
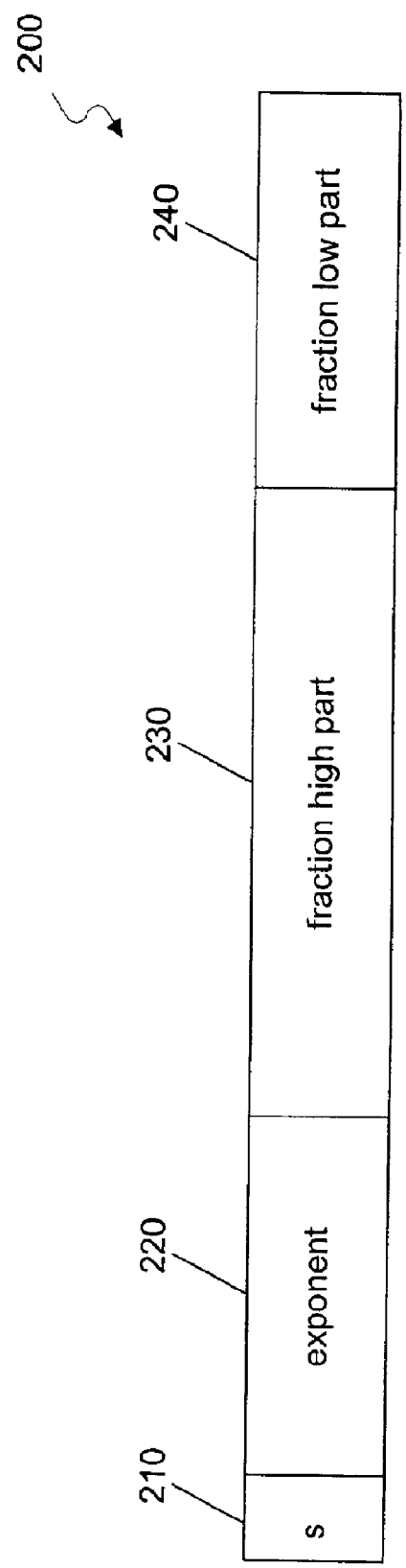
FIG. 2 illustrates an exemplary floating point operand.

Referring to FIG. 1, the exemplary floating point unit 100 comprises an operand buffer 110, an operand analysis circuit 120, a processing circuit 130, and a result generator 140. In operation, the operand buffer 110 receives and stores a floating point operand. As shown in FIG. 2, an exemplary 32-bit floating point operand 200 may include a sign bit 210, an exponent field 220 having eight exponent field bits, $e_{msb} \ldots e_{lsb}$, and a fraction field having a high part 230 and a low part 240 that together includes twenty-three fraction field bits, $f_{msb} \ldots f_{lsb}$. To compute the high part of the floating point operand 200, the floating point unit 100 operates by dividing the fraction field into two parts, the high part 230 and the low part 240. In the 32-bit example, the fraction field high part 230 may consist of the eleven most significant bits, $f_{msb} \ldots f_{lsb+12}$, of the operand fraction field. The fraction field low part 240 may consist of the remaining twelve least significant bits, $f_{lsb+11} \ldots f_{lsb}$, of the operand fraction field. In alternate embodiments, the bits of the operand 200 may be distributed among the various fields in a variety of different combinations. For example, the exponent field 220 may consist of eight bits, the fraction field high part 230 may consist of the twelve most significant bits, $f_{msb} \ldots f_{lsb+11}$, of the operand fraction field, and the fraction field low part 240 may consist of the remaining eleven least significant bits, $f_{lsb+10} \ldots f_{lsb}$, of the operand fraction field.

The operand analysis circuit 120 analyzes the floating point operand 200 received from the operand buffer 110 and generates one or more signals that indicate the format of the operand. As discussed above, the floating point unit 100 computes the high part of the floating point operand 200 based on the format of the operand 200. Accordingly, the signals indicating the format are provided to the result generator 140.

The processing circuit 130 receives the fraction field low part 240 of the floating point operand 200 and may clear one or more bits of the fraction field low part 240, thereby reducing the value of the fraction of the floating point operand 200, and outputs the resulting fraction field low part to the result generator 140. Additionally, the processing circuit 130 adaptively clears the bits of the fraction field low part 240, as discussed above and in greater detail below.

The result generator 140 receives the floating point operand 200 from the operand buffer 110, the signals indicating the operand's format from the operand analysis circuit 120, and the resulting fraction field low part provided by the processing circuit 130 to assemble a resulting floating point number equivalent to the high part of the floating point operand 200 stored in operand buffer 110. In a more detailed description of an embodiment of the invention, the resulting floating point number assembled by result generator 140 may have the same sign as the floating point operand 200 stored in operand buffer 110. Furthermore, the resulting floating point number assembled by result generator 140 may have the same exponent field 220 as the floating point operand 200 stored in operand buffer 110, unless the floating point operand 200 is in an infinity or overflow format shown in FIG. 12 and in related U.S. patent application Ser. No. 10/035,747 or an infinity format according to IEEE Std. 754, as discussed in greater detail below. Still further, the resulting floating point number assembled by result generator 140 may have the same fraction field high part 230 as the floating point operand 200 stored in operand buffer 110, unless the floating point operand 200 is in an infinity or overflow format shown in FIG. 12 and in related U.S. patent application Ser. No. 10/035,747 or an infinity format according to IEEE Std. 754, as discussed in greater detail below. Finally, the fraction field low part of the resulting floating point number assembled by result generator 140 may equal zero, unless the floating point operand 200 stored in operand buffer 110 is (1) in a NaN format according to U.S. patent application Ser. No. 10/035,747 or IEEE Std. 754; (2) a subprecise number in a delimited format according to U.S. Pat. No. 6,131,106; or (3) a denormalized format according to IEEE Std. 754. If the floating point operand 200 is in a NaN format according to U.S. patent application Ser. No. 10/035,747 or IEEE Std. 754, the fraction field low part of the resulting floating point number assembled by result generator 140 may equal the fraction field low part 240 of the operand 200. If the floating point operand 200 is a subprecise number in a delimited format according to U.S. Pat. No. 6,131,106 or in a denormalized format according to IEEE Std. 754, the fraction field low part of the resulting floating point number assembled by result generator 140 may equal the fraction field low part provided by the processing circuit 130. The resulting floating point number assembled by result generator 140 may have a smaller fraction than the input floating point operand stored in operand buffer 110 and may have a significand that may be squared exactly, without loss of precision.

Figure 3:
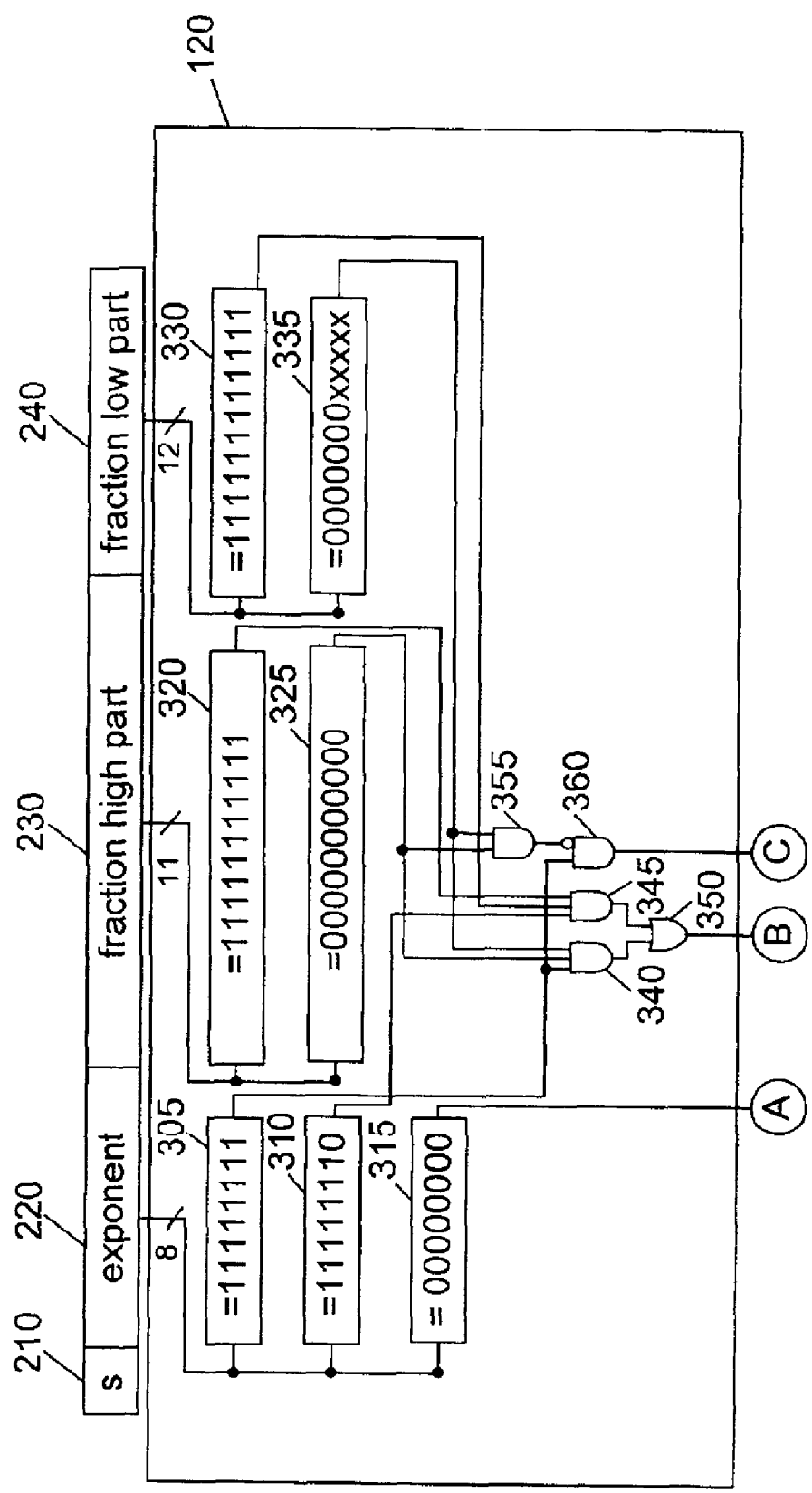
FIG. 3 illustrates an exemplary operand analysis circuit for analyzing a floating point operand according to an exemplary embodiment of the present invention.

FIG. 3 illustrates a first exemplary embodiment of the operand analysis circuit 120 that may be used when the floating point operand 200 stored in the operand buffer 110 is in a zero, underflow, overflow, infinity, or NaN format according to U.S. patent application Ser. No. 10/035,747 or in a normalized delimited format as disclosed in U.S. Pat. No. 6,131,106.

Figure 12:
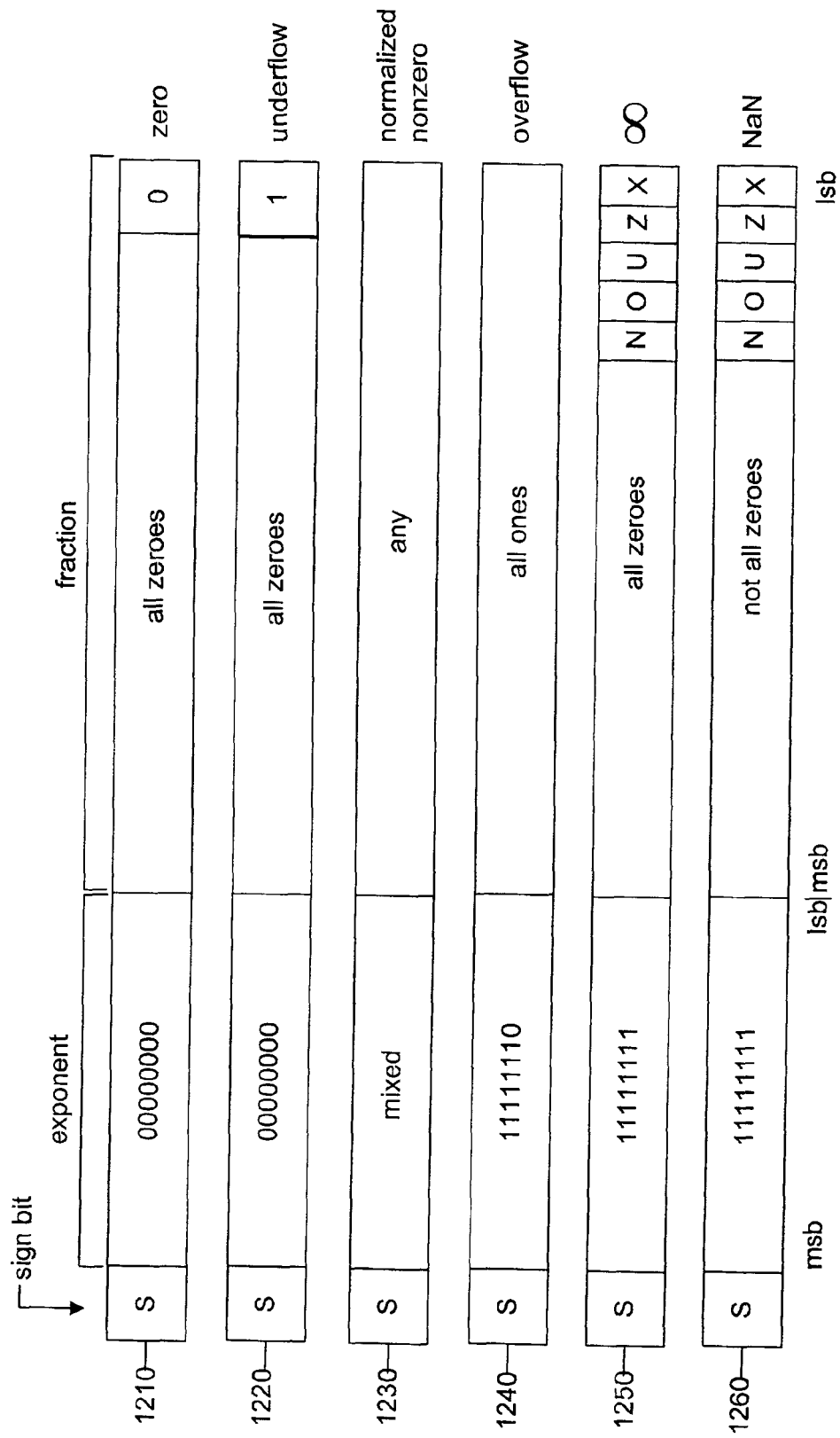
FIG. 12 illustrates exemplary formats for representing a floating point operand.

FIG. 12 illustrates several exemplary formats for an operand, such as the zero format 1210, the underflow format 1220, the normalized nonzero format 1230, the overflow format 1240, the infinity format 1250, and the NaN format 1260, as disclosed in U.S. patent application Ser. No. 10/035,747. As shown in the embodiment illustrated in FIG. 12, in the zero format 1210, the exponent field bits, $e_{msb} \ldots e_{lsb}$, and the fraction field bits, $f_{msb} \ldots f_{lsb}$, are all binary zeros. In the underflow format 1220, the exponent field bits, $e_{msb} \ldots e_{lsb+1}$, are all binary zeros, the twenty-two most significant fraction field bits, $e_{msb} \ldots f_{lsb}$, are all binary zeros, and the least significant fraction field bit, $f_{lsb}$, is a binary one. In the normalized nonzero format 1230, the exponent field bits, $e_{msb} \ldots e_{lsb}$, are neither all binary ones nor all binary zeros. In the overflow format 1240, the seven most significant exponent field bits, $e_{msb} \ldots e_{lsb}$, are all binary ones, with the least significant bit, $e_{lsb}$, being a binary zero, and the fraction field bits, $f_{msb} \ldots f_{lsb}$, are all binary ones. In the infinity format 1250, the exponent field bits, $e_{msb} \ldots e_{lsb}$, are all binary ones, the eighteen most significant fraction field bits, $f_{msb} \ldots f_{lsb}$, are all binary zeros, and the five least significant fraction field bits, $f_{lsb+4} \ldots f_{lsb}$, are flags. In the NaN format 1260, the exponent field bits, $e_{msb} \ldots e_{lsb}$, are all binary ones, the eighteen most significant fraction field bits, $f_{msb} \ldots f_{lsb+5}$, are not all binary zeros, and the five least significant fraction field bits, $f_{lsb+4} \ldots f_{lsb}$, are flags.

FIG. 13 illustrates an example of a delimited format 1310 as disclosed in U.S. Pat. No. 6,131,106. In the delimited format 1310, the exponent field bits, $e_{msb} \ldots e_{lsb}$, are all binary zeros. The bits in the fraction field correspond to the bits in the fraction field of the denormalized format 1320 shifted to the left by n bits, where n equals the number of leading zeros in the fraction field of the denormalized format 1320 plus one. Thus, the delimited format 1310 provides an implicit most significant digit having a value equal to a binary one in the fraction field. Further, in the delimited format 1310, a delimiter flag 1330 is provided in the fraction field at a bit position to the right of the bit which corresponds to the least significant fraction field bit in the denormalized format 1320. The delimiter flag 1330 indicates the series of fraction field bits of the delimited format 1310 that correspond to the series of bits immediately to the right of the most significant fraction field bit of the denormalized format 1320. The number of successive fraction field bits, $f_{msb} \ldots f_{lsb}$, from the most significant bit, $f_{msb}$, to the first bit $f_{msb-n}$ that has the value one in the denormalized format 1320 will correspond to the number of bits $f_{lsb+n} \ldots f_{lsb}$ of the delimited format 1310 following the delimiter flag 1330. The delimiter flag 1330 corresponds to the least significant bit of the delimited format having the value one.

Returning to FIG. 3, the exemplary operand analysis circuit 120 comprises comparators 305–335 and logic elements 340–360. The comparator 305 generates an asserted signal if the exponent field bits, $e_{msb} \ldots e_{lsb}$, of the operand 200 are all binary ones, which will be the case if the operand is in the infinity format 1250 or the NaN format 1260. If the operand is in the overflow format 1240, the comparator 310 generates an asserted signal. If the operand is in the zero format 1210, underflow format 1220, or delimited format 1310 the comparator 315 generates an asserted signal.

Further, the comparator 320 generates an asserted signal if the fraction field high part bits 230, $f_{msb} \ldots f_{lsb+12}$, of the operand are all binary ones, which may be the case if the operand is in the delimited format 1310, denormalized format, normalized non-zero format 1230, overflow format 1240, or NaN format 1260. The comparator 325 generates an asserted signal if the fraction field high part bits 230, $f_{msb} \ldots f_{lsb+12}$, of the operand 200 are all binary zeros, which will be the case if the operand is in the zero format 1210, underflow format 1220, or infinity format 1250, and may be the case if the operand is in the delimited format 1310, denormalized format, normalized non-zero format 1230, or NAN format 1260.

Still further, the comparator 330 generates an asserted signal if the fraction field low part bits 240, $f_{lsb+11} \ldots f_{lsb}$, of the operand 200 are all binary ones, which may be the case if the operand is in the delimited format 1310, normalized non-zero format 1230, or NaN format 1260, and which will be the case if the operand is in the overflow format 1240. Finally, the comparator 335 generates an asserted signal if all of the fraction field low part bits 240, $f_{lsb+11} f_{lsb}$ of the operand are all binary zeros, which will be the case if the operand is in the zero format 1210, and which may be the case if the operand is in the delimited format 1310, denormalized format, normalized non-zero format 1230, infinity format 1250, or NaN format 1260.

The combinatorial logic elements 340–360 receive selected ones of the signals from the comparators 305–335 and generate asserted signals to provide information regarding the operand's format. More specifically, the gate 360 generates an asserted signal, indicating the operand 200 is in the NaN format 1260, if the comparators 325 and 335 generate a negated signal and the comparator 305 generates an asserted signal. Furthermore, the AND gate 340 generates an asserted signal, indicating the operand 200 is in the infinity format 1250, if the comparators 305, 325, and 335 all generate asserted signals. Still further, the AND gate 345 generates an asserted signal, indicating the operand 200 is in the overflow format 1240, if the comparators 310, 320, and 330 all generate asserted signals. The OR gate 350 generates an asserted signal if the operand 200 is in the overflow format 1240 or infinity format 1250.

Figure 4:
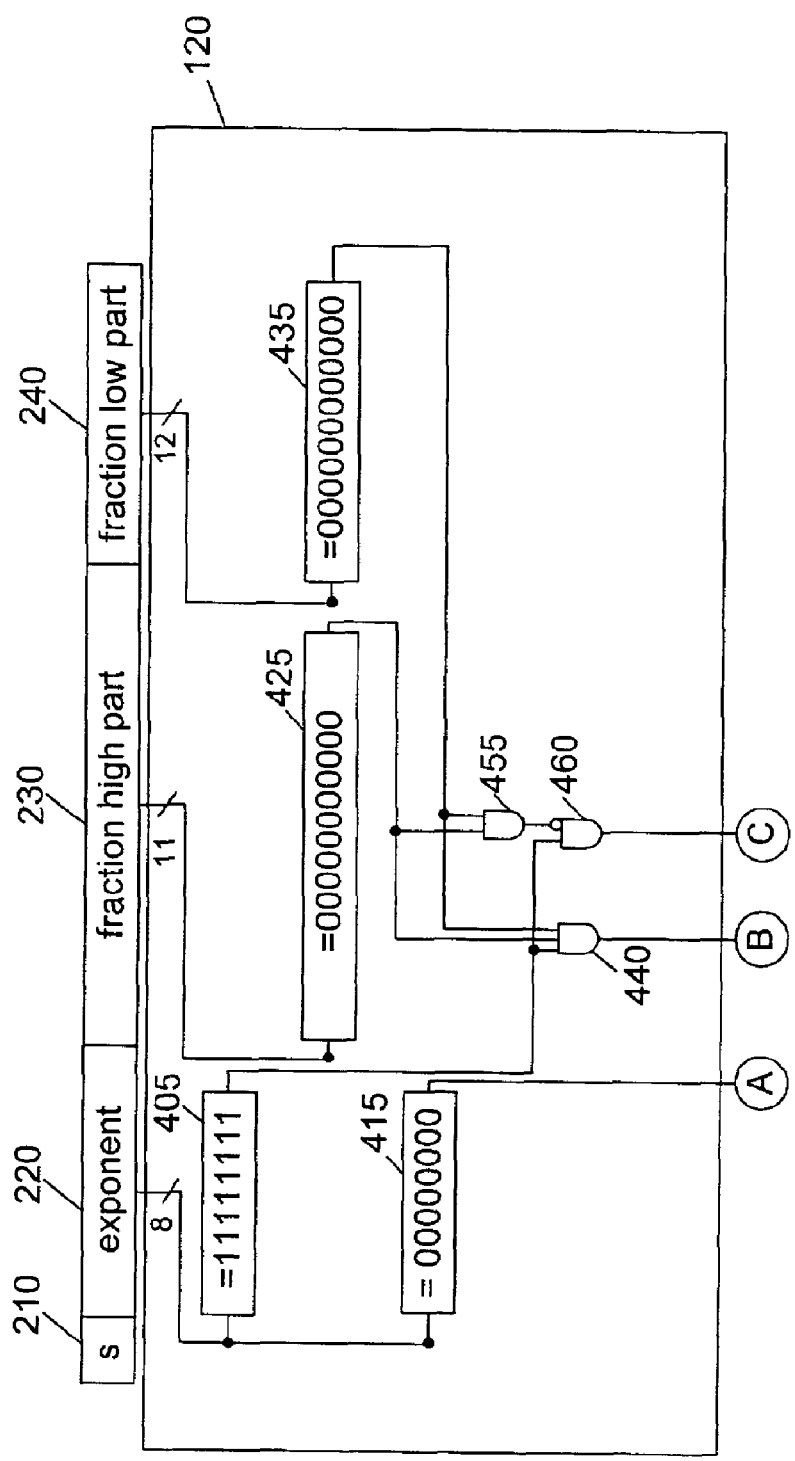
FIG. 4 illustrates an exemplary operand analysis circuit for analyzing a floating point operand according to an exemplary embodiment of the present invention.

FIG. 4 illustrates a second embodiment of the operand analysis circuit 120 that may be used when the floating point operand 200 stored in the operand buffer 110 is represented according to IEEE Std. 754. The operand analysis circuit 120 of FIG. 4 operates in a similar manner as the operand analysis circuit 120 of FIG. 3, except that comparators 310, 320, and 330 and logic elements 345 and 350 have been removed because there is no overflow format 1240 in IEEE Std. 754. Still further, the comparator 335 in FIG. 3 is replaced by comparator 435 in FIG. 4 because IEEE Std. 754 does not store status information in the operand.

Figure 5:
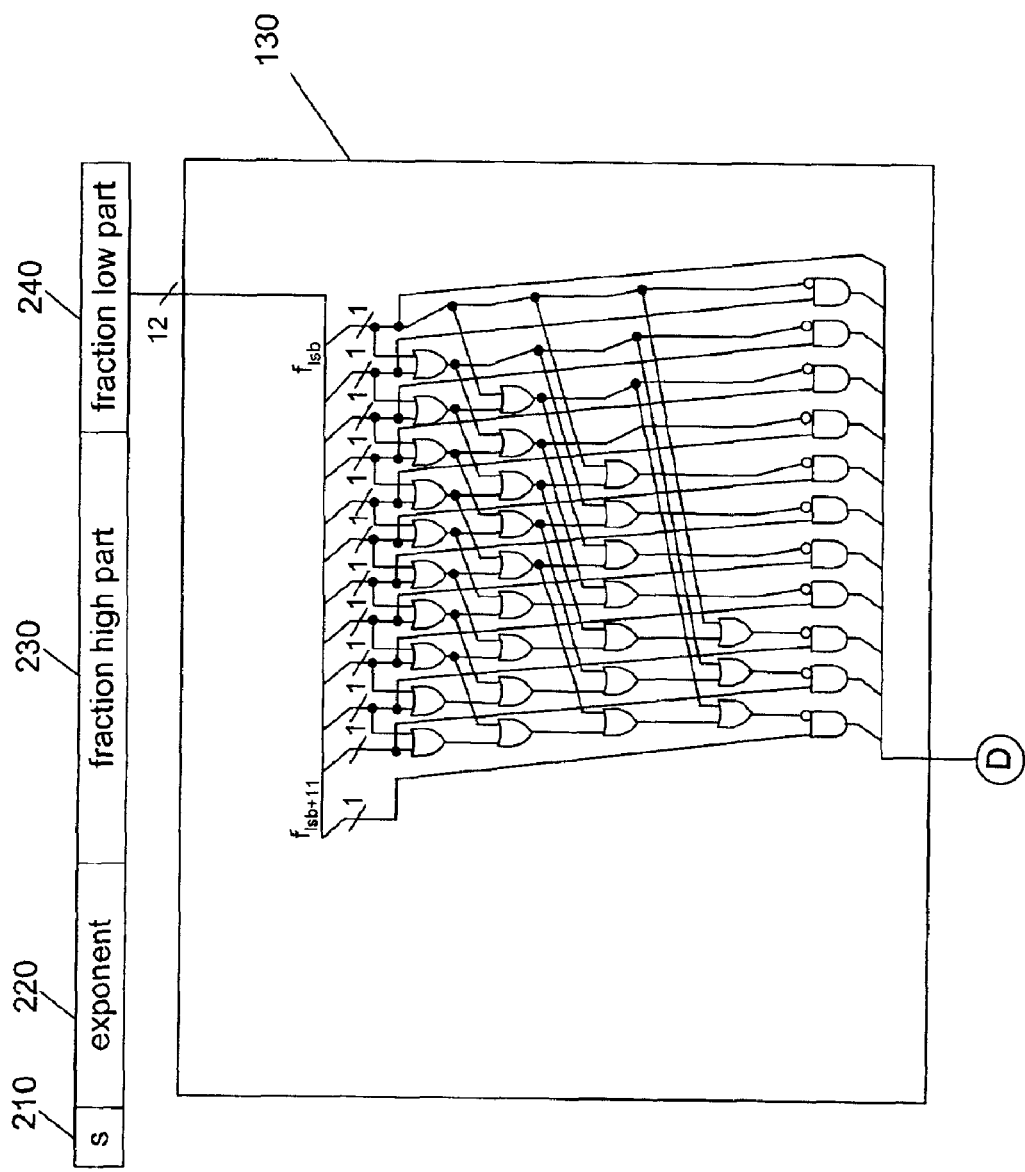
FIG. 5 illustrates an exemplary processing circuit for processing a floating point operand according to an exemplary embodiment of the present invention.

FIG. 5 illustrates a first embodiment of processing circuit 130 that may be used when the floating point operand 200 stored in the operand buffer 110 is subprecise and in a normalized delimited format as disclosed in U.S. Pat. No. 6,131,106. The processing circuit 130 may be used to adaptively clear one or more fraction field low part bits 240 of the operand 200 stored in operand buffer 110. The processing circuit 130 receives the signals representative of the fraction field low part bits 240, $f_{lsb+11} \ldots f_{lsb}$, of the operand 200 and sets all the bits equal to a binary zero, except the rightmost bit that equals a binary one (i.e., the delimiter flag). More specifically, the processing circuit 130 includes an array of k−1 AND gates, where k equals the number of fraction field low part bits 240. In the present embodiment, k equals 12. However, k may be greater than or less than 12 in alternate embodiments. The n-th AND gate from the right outputs the resulting (n+1)-th fraction field low part bit from the right (n=1, 2, ..., k−1). The n-th AND gate receives as a first input the (n+1)-th fraction field low part bit from the right. The second input to the n-th AND gate is a negated signal produced by the array of OR gates that (1) equals a binary one if no bit to the right of the (n+1)-th fraction field low part bit equals a binary one or (2) equals a binary zero if at least one bit to the right of (n+1)-th the fraction field low part bit equals a binary one. Therefore, the n-th AND gate clears the (n+1)-th fraction field low part bit of the operand 200 if there exists at least one bit to the right of the (n+1)-th fraction field low part bit that equals a binary one. Otherwise, the n-th AND gate outputs the (n+1)-th fraction field low part bit of the operand 200 as the resulting (n+1)-th fraction field low part bit if no bit to the right of the (n+1)-th fraction field low part bit equals a binary one. The least significant resulting fraction field low part bit equals the least significant fraction field low part bit, $f_{lsb}$, of the operand 200. The processing circuit 130 adaptively clears the fraction field low part bits 240 of the operand 200 stored in operand buffer 110 because the number of bits cleared is not a predetermined number, but instead changes based on the fraction field low part bits 240 received by the processing circuit 130.

Figure 6:
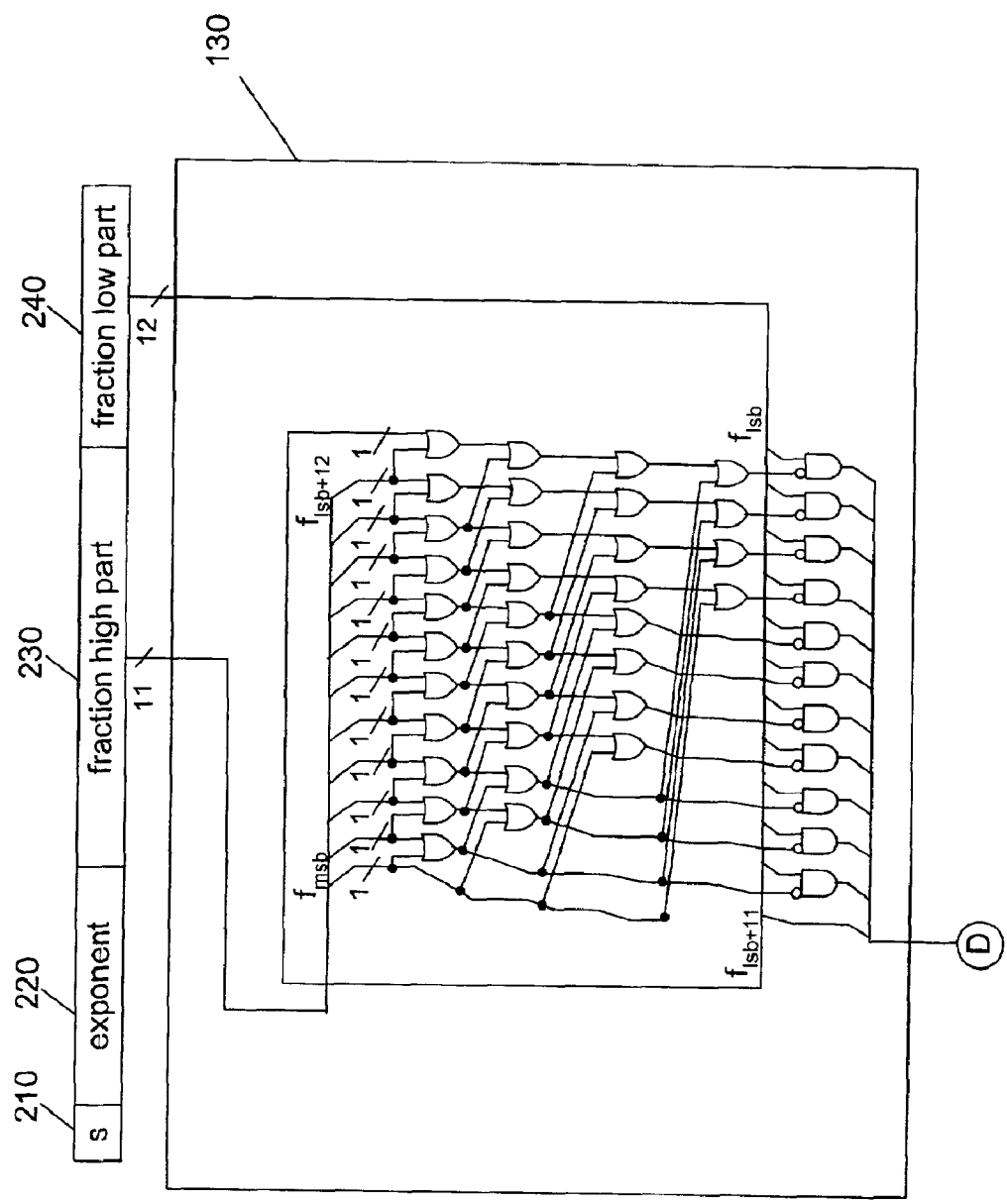
FIG. 6 illustrates an exemplary processing circuit for processing a floating point operand according to an exemplary embodiment of the present invention.

FIG. 6 illustrates a second embodiment of processing circuit 130 that may be used when the floating point operand 200 stored in the operand buffer 110 is subprecise and in a denormalized format according to IEEE 754. The processing circuit 130 may be used to adaptively clear one or more fraction field low part bits 240 of the operand 200 stored in operand buffer 110. The processing circuit 130 of FIG. 6 receives the signals representative of the fraction field high part bits 230, $f_{msb} \ldots f_{lsb+12}$, and the fraction field low part bits 240, $f_{lsb+11} \ldots f_{lsb}$, of the operand 200. The processing circuit 130 sets the fraction field low part bits 240, $f_{lsb+11} \ldots f_{lsb}$, based on the fraction field high part bits 230, $f_{msb} \ldots f_{lsb+12}$. Generally, the smaller the number represented by the fraction field bit of the operand 200 (i.e., the greater the number of leading zeros in the fraction field high part bits 230, $f_{msb} \ldots f_{lsb+12}$), the fewer the number of least significant bits of the fraction field low part bits 240, $f_{lsb+11} \ldots f_{lsb}$, that are set equal to a binary zero. For example, in the embodiment illustrated in FIG. 6, let the bit positions of a fraction field be numbered from 1 to 23, where 1 is the right-most fraction field bit and 23 is left-most fraction field bit, the n-th fraction field low part bit from the right (n=1, . . . k−1, where k equals the number of fraction field low part bits 240) is cleared if at least the (n+11)-th fraction field bit or any fraction field bit to the left of the (n+11)-th fraction field bit is equal to a binary one. If neither the (n+11)-th fraction field bit nor any fraction field bit to the left of the (n+11)-th fraction field bit is equal to a binary one, then the n-th fraction field low part bit of the operand 200 is not cleared by the processing circuit 130.

More specifically, processing circuit 130 of FIG. 6 includes an array of k−1 AND gates. In the present embodiment, k equals 12. However, as discussed above, in alternate embodiments, k may be greater than or less than 12. The n-th AND gate from the right outputs the resulting n-th fraction field low part bit from the right (n=1, 2, . . . , k−1). The n-th AND gate receives as a first input the n-th fraction field low part bit from the right. The second input to the n-th AND gate is a negated signal produced by the array of OR gates that (1) equals a binary one if neither the (n+11)-th fraction field bit nor any fraction field bit to the left of the (n+11)-th fraction field bit equals a binary one or (2) equals a binary zero if at least the (n+11)-th fraction field bit or any fraction field bit to the left of the (n+11)-th fraction field bit equals a binary one. Therefore, the n-th AND gate clears the n-th fraction field low part bit from the right if at least the (n+11)-th fraction field bit or any fraction field bit to the left of the (n+11)-th fraction field bit equals a binary one. Otherwise, the n-th AND gate outputs the n-th fraction field low part bit as the resulting n-th fraction field low part bit if neither the (n+11)-th fraction field bit nor any fraction field bit to the left of the (n+11)-th fraction field bit equals a binary one.

The most significant resulting fraction field low part bit equals the most significant fraction field low part bit, $f_{lsb+11}$, of the operand 200. The processing circuit 130 adaptively clears the fraction field low part bits 240 of the operand 200 stored in operand buffer 110 because the number of bits cleared changes based on the fraction field high part bits 230 received by the processing circuit 130.

Figure 7:
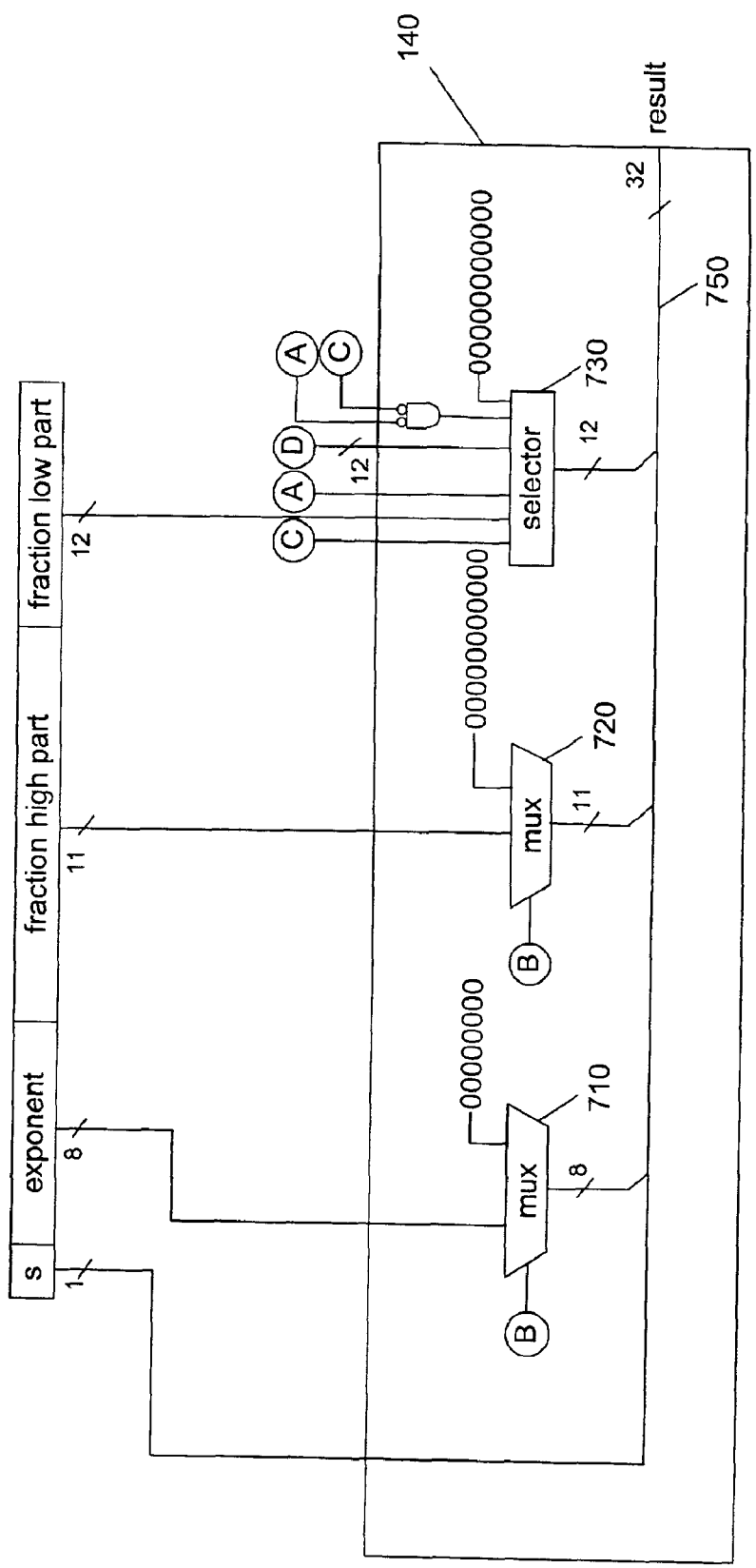
FIG. 7 illustrates an exemplary result generator for assembling a result according to an exemplary embodiment of the present invention.
Figure 8:
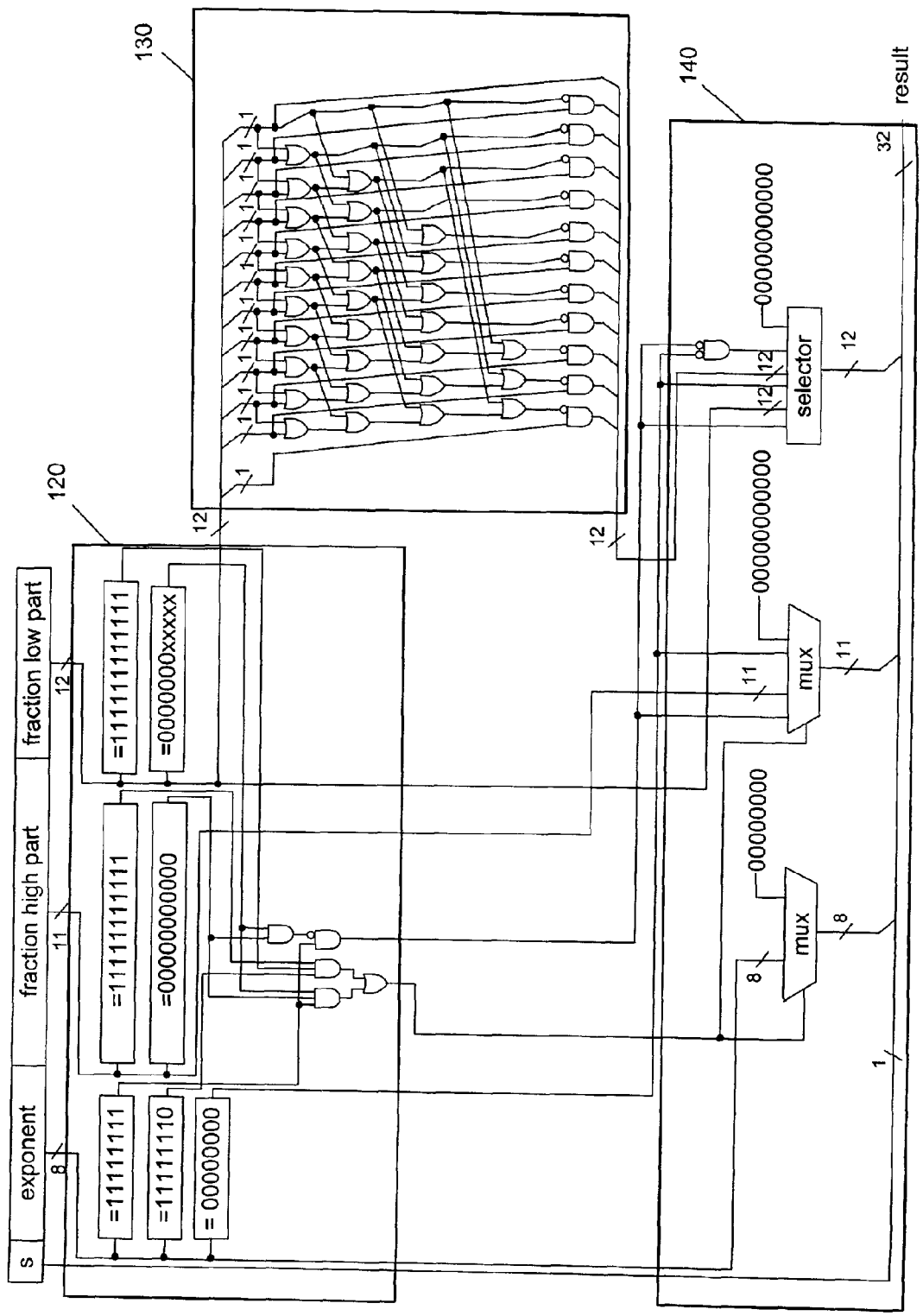
FIG. 8 illustrates a first embodiment of a floating point unit for computing the high part of a floating point operand according to an exemplary embodiment of the present invention.
Figure 9:
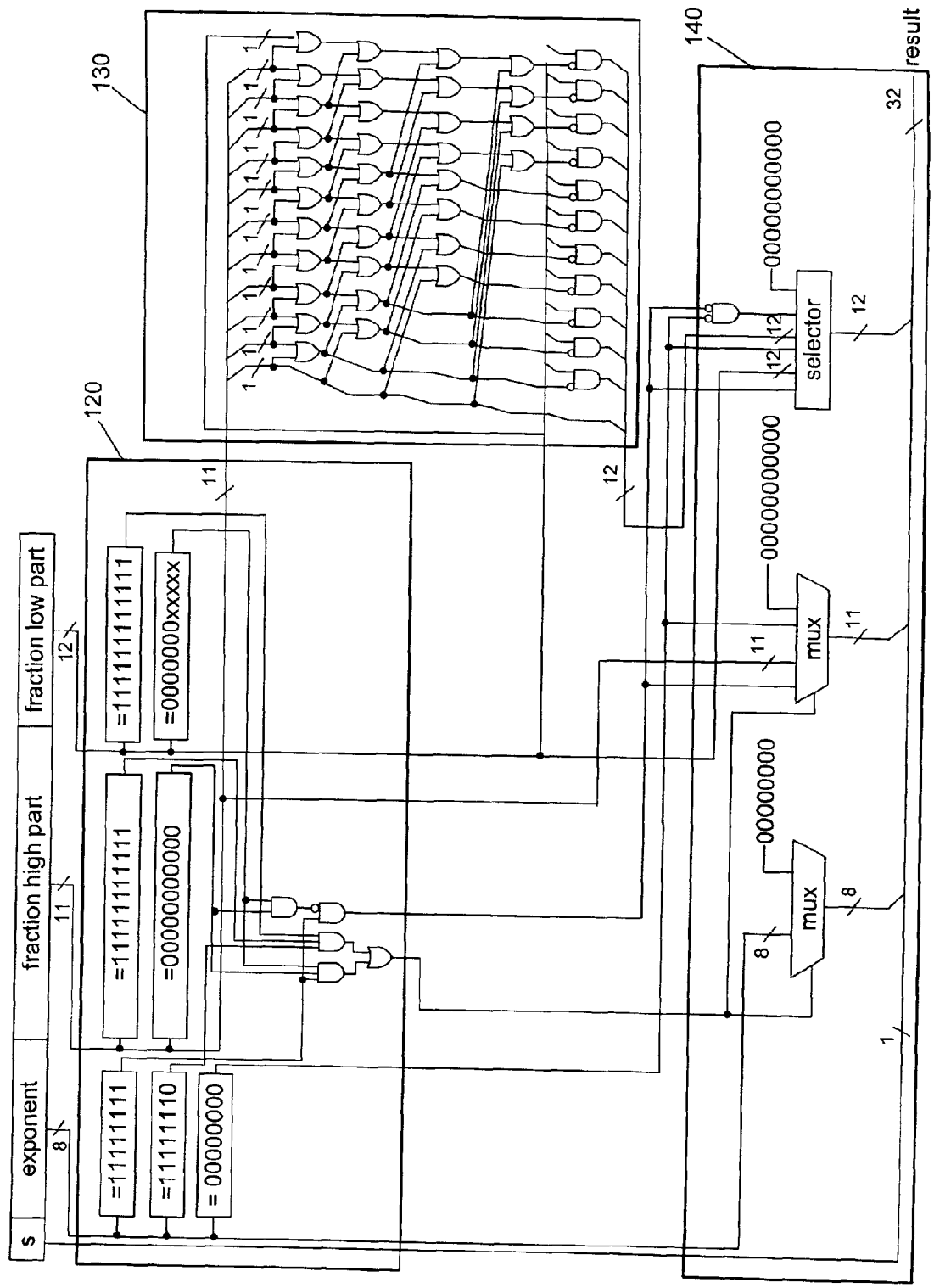
FIG. 9 illustrates a second embodiment of a floating point unit for computing the high part of a floating point operand according to an exemplary embodiment of the present invention.
Figure 10:
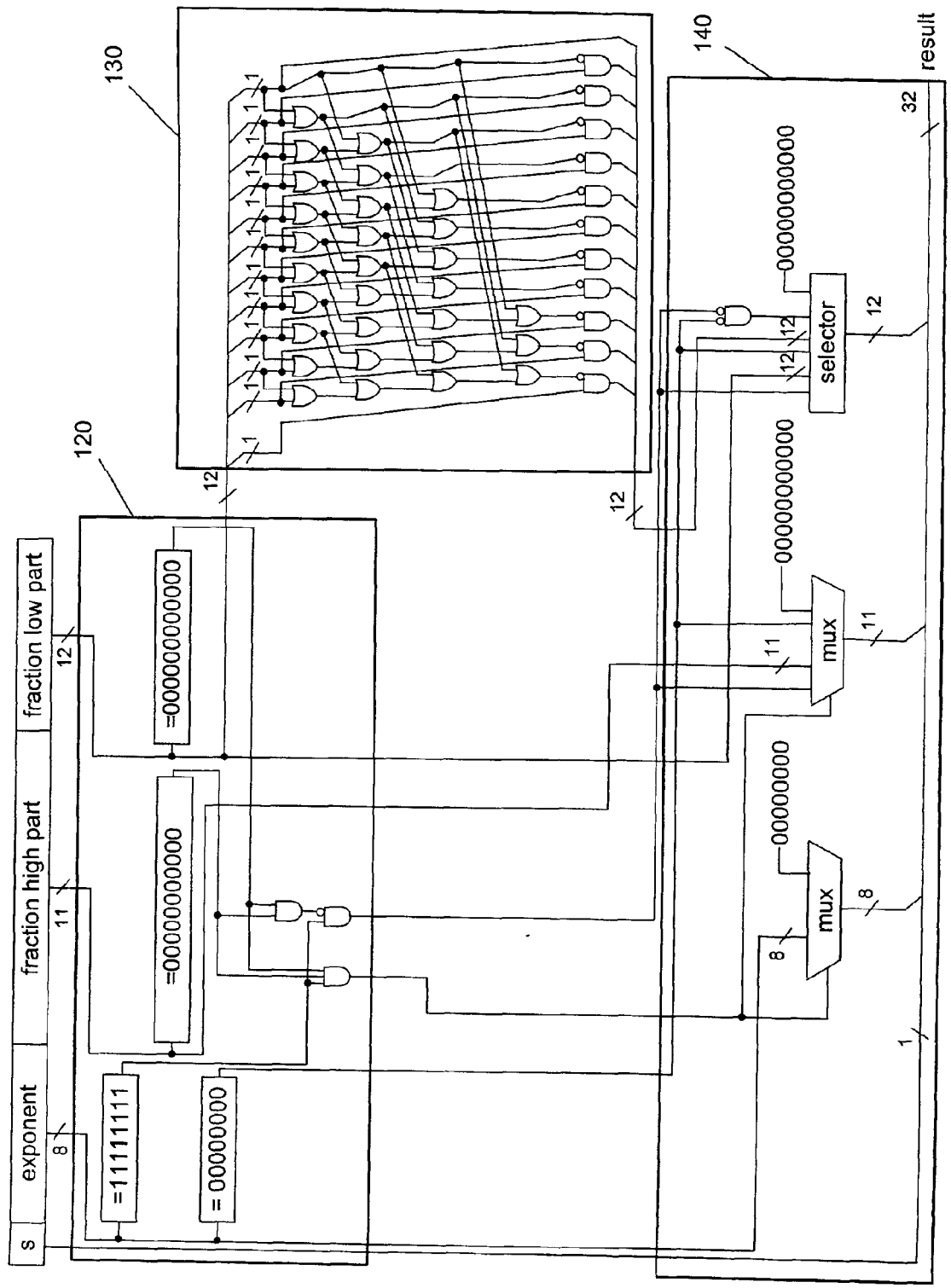
FIG. 10 illustrates a third embodiment of a floating point unit for computing the high part of a floating point operand according to an exemplary embodiment of the present invention.
Figure 11:
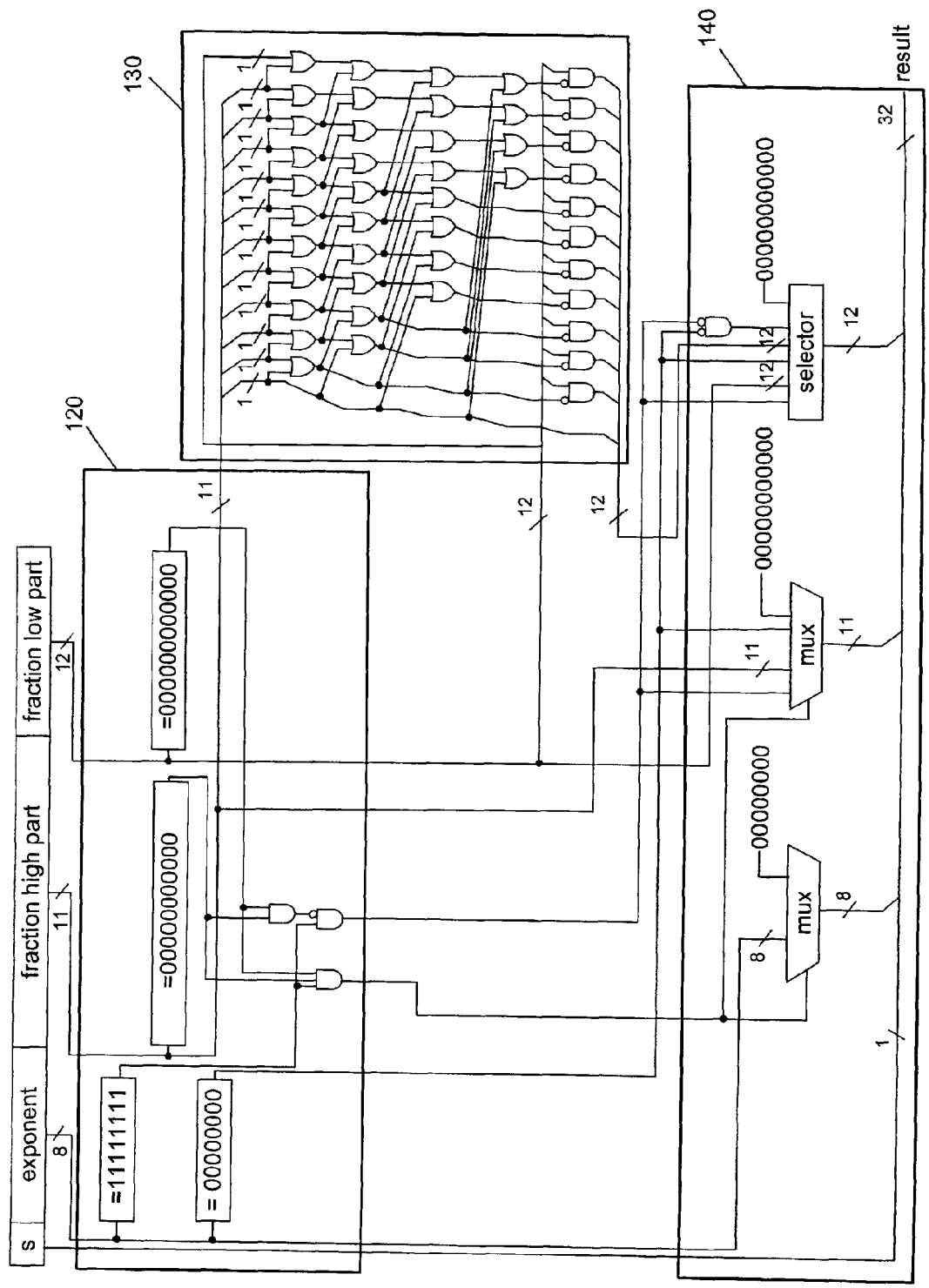
FIG. 11 illustrates a fourth embodiment of a floating point unit for computing the high part of a floating point operand according to an exemplary embodiment of the present invention.

FIG. 7 illustrates an exemplary embodiment of the result generator 140. The result generator 140 receives the signals from the operand analysis circuit 120, the signal representative of the sign bit 210, the signals representative of the exponent field bits 220, $e_{msb}$ . . . $e_{lsb}$, of the operand 200, the signals representative of the fraction field high part bits 230, $f_{msb}$ . . . $f_{lsb+12}$, of the operand 200, the signals representative of the fraction field low part bits 240, $f_{lsb+11}$ . . . $f_{lsb}$, of the operand 200, and the signals provided by the processing circuit 130. In response, the result generator 140 assembles a result that is coupled onto a result bus 750.

Generally, the result generator 140 passes the signal representative of the sign bit 210 to the result bus 750. Accordingly, the sign bit of the result may be the same as the sign bit 210 of the operand 200.

Multiplexer 710 receives signals representative of the exponent field bits 220, $e_{msb}$ . . . $e_{lsb}$, of the operand 200 and signals representative of a bit pattern of all zeros. The multiplexer 710 may be controlled by signals "B" from the operand analysis circuit 120 and may selectively couple one set of signals to the result bus 750. More specifically, if the signals "B" from the operand analysis circuit 120 indicate that the operand 200 is in an infinity 1250 or overflow 1240 format, the multiplexer 710 may couple the signals representative of the bit pattern of all zeros to the result bus 750 as the exponent field bit of the result. Otherwise, the multiplexer 710 may couple the signals representative of the exponent field bits, $e_{msb}$ . . . $e_{lsb}$, of the operand 200 to the result bus 750 as the exponent field bits of the result.

Similarly, multiplexer 720 receives signals representative of the fraction field high part bits, $f_{msb}$ . . . $f_{lsb+12}$, of the operand 200 and signals representative of a bit pattern of all zeros. The multiplexer 720 may be controlled by signals "B" from the operand analysis circuit 120 and may selectively couple one set of signals to the result bus 170. More specifically, if the signals from the operand analysis circuit 120 indicate that the operand 200 is an infinity 1250 or overflow 1240 format, the multiplexer 720 may couple the signals representative of the bit pattern of all zeros to the result bus 750 as the fraction field high part bits of the result. Otherwise, the multiplexer 720 may couple the signals representative of the fraction field high part bits 230, $f_{msb}$ . . . $f_{lsb+12}$, of the operand 200 to the result bus 750 as the fraction field high part bits of the result.

The selector 730 receives the signals representative of the fraction field low part bits 240, $f_{lsb+11}$ . . . $f_{lsb}$, of the operand 200, the signals "D" representing the resulting fraction field low part bits provided by the processing circuit 130, and signals representative of a bit pattern of all zeros. The selector 730 may be controlled by signals "A" and "C" from the operand analysis circuit 120 and may selectively couple one set of signals to the result bus 750. More specifically, if the signals from the operand analysis circuit 120 indicate that the operand 200 is in the NaN format 1260, the selector 730 may couple the signals representative of the fraction field low part bits 240, $f_{lsb+11}$ . . . $f_{lsb}$, of the operand 200 to the result bus 750 as the fraction field low part bits of the result. If the signals from the operand analysis circuit 120 indicate that the operand 200 is a subprecise number, the selector 730 may couple the signals "D" provided by the processing circuit 130 to the result bus 750 as the fraction field low part bits of the result. Otherwise, the selector 730 may couple the signals representative of the bit pattern of all zeros to the result bus 750 as the fraction field low part bits of the result.

FIGS. 8–11 illustrates four exemplary embodiments of the floating point unit 100 with the different embodiments of the operand analysis circuit 120, the processing circuit 130, and the result generator 140 combined in various combinations. The floating point unit of FIG. 8 may be used when the floating point operand 200 stored in the operand buffer 110 may be in an zero, underflow, overflow, infinity, or NaN format according to U.S. patent application Ser. No. 10/035,747 or in a normalized delimited format according to U.S. Pat. No. 6,131,106. The floating point unit 100 of FIG. 9 may be used when the floating point operand 200 stored in the operand buffer 110 may be in an overflow, infinity, or NaN format according to U.S. patent application Ser. No. 10/035,747 or in a denormalized format according to IEEE 754. The floating point unit of FIG. 10 may be used when the floating point operand 200 stored in the operand buffer 110 may be represented according to IEEE Std. 754 or in a normalized delimited format according to U.S. Pat. No. 6,131,106. The floating point unit of FIG. 11 may be used when the floating point operand 200 stored in the operand buffer 110 may be represented according to IEEE Std. 754 including the denormalized format according to IEEE 754.

In summary, floating point unit 100 may be used to compute the high part of a floating point operand. The sign of the result generated by the floating point unit 100 may be the same as the sign 210 of the floating point operand 200 stored in the operand buffer 110. If the operand 200 is in a NaN format according to U.S. patent application Ser. No. 10/035,747 or IEEE Std. 754, then the result generated by the floating point unit 100 may be the same NaN format (i.e., no bits are cleared). If the operand 200 is in an infinity format according to U.S. patent application Ser. No. 10/035,747 or IEEE Std. 754 or an overflow format 1240, then the result generated by the floating point unit 100 may be a binary zero with the same sign as the operand 200. If the operand 200 is in a zero format according to U.S. patent application Ser. No. 10/035,747 or IEEE Std. 754, then the result generated by the floating point unit 100 may be in a zero format with the same sign as the operand 200. If the operand 200 is a subprecise number, then the sign bit, the exponent field bits, and the fraction field high part bits of the result may be the same as the sign bit 210, the exponent field bits 220, and the fraction field high part bits 230 of the of the operand 200, respectively. The resulting fraction field low part bits are adaptively determined based on the fraction field low part bits 240 and/or the fraction field high part bits 230 of the operand 200. If the operand 200 is in any other format, then the sign bit, the exponent field bits, and the fraction field high part bits of the result may be the same as the sign bit 210, the exponent field bits 220, and the fraction field high part bits 230 of the operand 200, respectively. The resulting fraction field low part bits may be cleared.

An embodiment of the present invention produces a zero result when the operand is in an infinity or overflow format. Accordingly, when computing the low part of an operand that is in an infinity or overflow format by subtracting the high part of the operand from the operand, the result is not in a NaN format. Further, an embodiment of the present invention produces a result equal to the operand when the operand is in a NaN format, thereby preserving useful status information stored in the operand. Further, when computing the low part of an operand that is in the NaN format by subtracting the high part of the operand from the operand, the result is in the NaN format, if the subtraction operation is performed according to the IEEE Std. 754. Finally, an embodiment of the present invention receives a floating point operand from an operand buffer 110 and computes the high part of the floating point operand without storing the floating point operand in additional memory as part of the process to compute the high part of the operand.

The above description of the floating point unit 100 assumes a 32-bit floating point operand 200. However, the floating point unit 100 may be adapted to receive a floating point operand having any number of bits. For example, the floating point unit 100 may be adapted to receive a 64-bit floating-point operand with 52 fraction field bits. Adapting the floating point unit 100 to receive a floating point operand having any number of bits is known to those skilled in the art.

Further, the above description of the floating point unit 100 assumed that the floating point operands are represented in a number base of two. However, the floating point unit 100 may be adapted for floating point operands represented in number bases other than base two, using, for example, decimal digits or hexadecimal (base 16) digits rather than binary bits. Adapting the floating point unit 100 to receive floating point operands represented in other number bases will be obvious to those of ordinary skill in the art.

Still further, the above description of the floating point unit 100 has been limited to operands according to U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, U.S. Pat. No. 6,131,106, and IEEE Std. 754. However, the floating point unit may be adapted to receive a floating point operand having a different format including having a different bit positions for storing status information. Adapting the floating point unit to receive a floating point operand having a different format will be obvious to those of ordinary skill in the art.

Finally, the floating point unit 100 and all or part of its functionality may be implemented in software, firmware, hardware, or any combination thereof. For example, the invention may be practiced in an electrical circuit comprising discrete electronic elements, packaged or integrated electronic chips containing logic gates, a electronic elements, packaged or integrated electronic chips containing logic gates, circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements which may be connected directly to the system or which may transfer the information to the system over a network or other mechanism for transferring information in a conventional manner.

Other embodiments of the invention will be apparent to those skilled in the art from consideration of the specification and practice of the invention disclosed herein. For example, the floating point unit 100 may be implemented in software, firmware, hardware, or any combination thereof. It is intended that the specification and examples be considered as exemplary only, with a true scope and spirit of the invention being indicated by the following claims.

What is claimed is:

1. A method for determining a high part of a floating point operand comprising:

determining a format of the floating point operand;

setting a plurality of exponent field digits and a plurality of fraction field digits of a result to a zero if the determined format is one of a first group comprising an infinity format and an overflow format;

setting the exponent field digits and the fraction field digits of the result to corresponding exponent field digits and corresponding fraction field digits of the floating point operand if the determined format is a not-a-number (NaN) format; and adaptively clearing at least one of the fraction field digits of the result if the determined format is one of a second group comprising a denormalized format and a delimited format, wherein the high part of the floating point operand is the result.

2. The method of claim 1, wherein the determining step further comprises identifying the format based upon embedded status information within the floating point operand.

3. The method of claim 1, wherein the adaptively clearing step further comprises setting a low part of the fraction field digits of the result to one of two values if the determined format is the denormalized format, the two values being based upon the number of leading zeros in the fraction field digits of the floating point operand.

4. The method of claim 3, wherein the first of the two values is the corresponding low part of the fraction field digits of the floating point operand, and wherein the second of the two values is zero.

5. The method of claim 1, wherein the adaptively clearing step further comprises setting a low part of the fraction field digits of the result to one of two values if the determined format is the delimited format, the two values being based upon a delimiter flag.

6. The method of claim 5, wherein the first of the two values is the corresponding low part of the fraction field digits of the floating point operand, and wherein the second of the two values is zero.

7. The method of claim 5, wherein the delimiter flag is within the corresponding low part of the fraction field digits of the floating point operand.

8. The method of claim 5, wherein the adaptively clearing step comprises setting the corresponding low part of the fraction field digits to zero with the exception of the delimiter flag.

9. A computer-readable medium having instructions, which when executed perform a method for determining a high part of a floating point operand comprising:

determining a format of the floating point operand;

setting a plurality of exponent field digits and a plurality of fraction field digits of a result to a zero if the determined format is one of a first group comprising an infinity format and an overflow format;

setting the exponent field digits and the fraction field digits of the result to corresponding exponent field digits and corresponding fraction field digits of the floating point operand if the determined format is a not-a-number (NaN) format; and adaptively clearing at least one of the fraction field digits of the result if the determined format is one of a second group comprising a denormalized format and a delimited format, wherein the high part of the floating point operand is the result.

10. The computer-readable medium of claim 9, wherein the determining step further comprises identifying the format based upon embedded status information within the floating point operand.

11. The computer-readable medium of claim 9, wherein the adaptively clearing step further comprises setting a low part of the fraction field digits of the result to one of two values if the determined format is the denormalized format, the two values being based upon the number of leading zeros in the fraction field digits of the floating point operand.

12. The computer-readable medium of claim 11, wherein the first of the two values is the corresponding low part of the fraction field digits of the floating point operand, and wherein the second of the two values is zero.

13. The computer-readable medium of claim 9, wherein the adaptively clearing step further comprises setting a low part of the fraction field digits of the result to one of two values if the determined format is the delimited format, the two values being based upon a delimiter flag.

14. The computer-readable medium of claim 13, wherein the first of the two values is the corresponding low part of the fraction field digits of the floating point operand, and wherein the second of the two values is zero.

15. The computer-readable medium of claim 13, wherein the delimiter flag is within the corresponding low part of the fraction field digits of the floating point operand.

16. The computer-readable medium of claim 13, wherein the adaptively clearing step comprises setting the corresponding low part of the fraction field digits to zero with the exception of the delimiter flag.

17. A system for determining a high part of a floating point operand, comprising:

an operand analysis circuit that determines a format associated with the floating point operand;

a processing circuit configured to receive a signal representative of at least a portion of the floating point operand and that adaptively sets at least one digit of an intermediate result based upon the received signal; and a result generator circuit that assembles a final result equal to the high part of the floating point operand based on the format of the floating point operand and the intermediate result.

18. The system of claim 17, wherein the operand analysis circuit determines the format based upon embedded status information within the floating point operand.

19. The system of claim 17, wherein the processing circuit is operative to adaptively set a low part of the fraction field digits of the intermediate result to one of two values if the determined format is a denormalized format, the two values being based upon the number of leading zeros in the fraction field digits of the floating point operand.

20. The system of claim 19, wherein the first of the two values is the corresponding low part of the fraction field digits of the floating point operand, and wherein the second of the two values is zero.

21. The system of claim 17, wherein the processing circuit is operative to adaptively set a low part of the fraction field digits of the intermediate result to one of two values if the determined format is a denormalized format, the two values being based upon a delimiter flag.

22. The system of claim 21, wherein the first of the two values is the corresponding low part of the fraction field digits of the floating point operand, and wherein the second of the two values is zero.

23. The system of claim 21, wherein the delimiter flag is within the corresponding low part of the fraction field digits of the floating point operand.

24. The system of claim 21, wherein processing circuit is further operative to set the corresponding low part of the fraction field digits to zero with the exception of the delimiter flag.

* * * * *